United States Patent
Ahrweiler et al.

(10) Patent No.: US 9,832,471 B2
(45) Date of Patent: Nov. 28, 2017

(54) DESCRIPTION ENCODING/DECODING OF INFORMATION FROM A GRAPHIC INFORMATION UNIT

(71) Applicants: Gesellschaft zur Foerderung angewandter Informatik e.V., Berlin (DE); Michael Ahrweiler, Berlin (DE)

(72) Inventors: Michael Ahrweiler, Berlin (DE); Daniel Herfert, Berlin (DE)

(73) Assignee: Gesellschaft Zur Foerderung Angewandter Informatik E.V., Berlin (DE)

(*) Notice: Subject to any disclaimer, the term of this patent is extended or adjusted under 35 U.S.C. 154(b) by 69 days.

(21) Appl. No.: 14/940,772

(22) Filed: Nov. 13, 2015

(65) Prior Publication Data

US 2016/0142713 A1 May 19, 2016

(30) Foreign Application Priority Data

Nov. 14, 2014 (DE) .................. 10 2014 116 692

(51) Int. Cl.
*G06K 9/48* (2006.01)
*H04N 19/136* (2014.01)
(Continued)

(52) U.S. Cl.
CPC ......... *H04N 19/136* (2014.11); *G06K 9/4604* (2013.01); *G06K 9/4652* (2013.01); *G06K 9/6215* (2013.01); *G06K 19/06103* (2013.01); *G06T 7/13* (2017.01); *G06T 7/73* (2017.01); *G06T 7/90* (2017.01); *H04N 13/0048* (2013.01); *H04N 19/167* (2014.11); *H04N 19/44* (2014.11);
(Continued)

(58) Field of Classification Search
CPC .... H04N 13/0048; H04N 19/44; H04N 19/65; H04N 19/136; H04N 19/167; G06K 19/06103; G06K 2009/4666; G06K 9/4604; G06K 9/4652; G06K 9/6215; G06T 2200/04; G06T 7/13; G06T 7/73; G06T 7/90
USPC .......................................................... 382/199
See application file for complete search history.

(56) References Cited

U.S. PATENT DOCUMENTS

| 7,978,911 | B2 * | 7/2011 | Cheong .................... G06K 7/14 235/462.04 |
| 8,144,922 | B2 | 3/2012 | Kawabe et al. |
| 8,526,670 | B2 | 9/2013 | Kawabe et al. |
| 8,820,629 | B1 * | 9/2014 | Galvin, Jr. ........ H04M 1/72566 235/375 |

(Continued)

FOREIGN PATENT DOCUMENTS

| DE | 20 2013 103 662 U1 | 10/2013 |
| EP | 2224373 A2 | 1/2010 |
| EP | 2731057 A2 | 5/2014 |
| WO | 2006033626 A1 | 3/2006 |

OTHER PUBLICATIONS

BARDOCAT GmbH: 2D Code Fibel BARDOCAT GmbH: 2D Code Fibel, 7. Auflage. Dornstetten, 2013. Firmenschrift.

*Primary Examiner* — Kanjibhai Patel
(74) *Attorney, Agent, or Firm* — Fox Rothschild LLP; Robert J. Sacco; Carol E. Thorstad-Forsyth

(57) ABSTRACT

Systems and methods for encoding information in a graphic information unit. The methods comprise: determining an outer contour of the graphic information unit; and encoding information with an at least two-dimensional code in at least one area located solely within the outer contour. The encoding is applied to image elements of the graphic information unit.

12 Claims, 8 Drawing Sheets

Figures 1A, 1B:
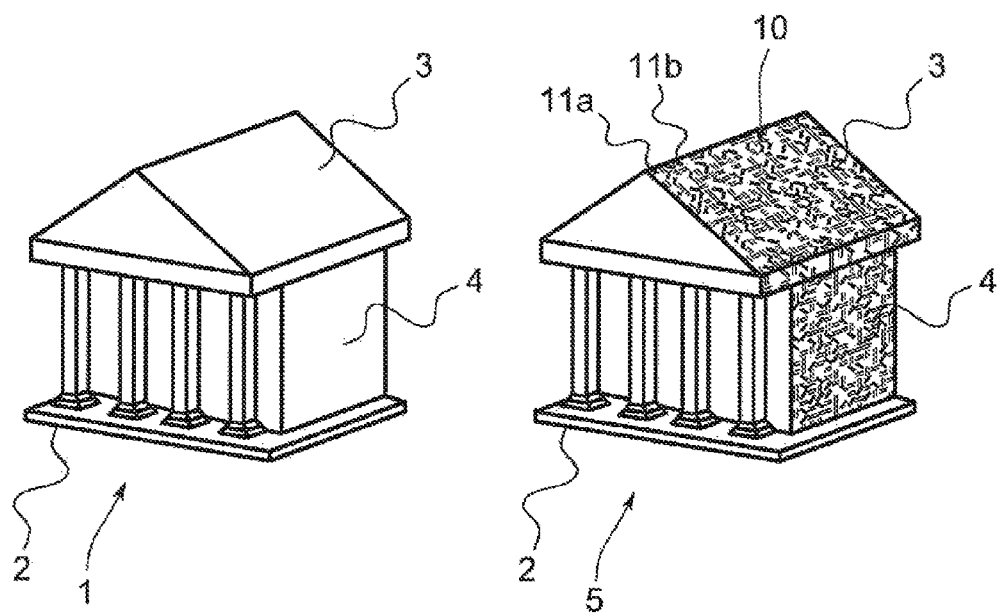

(51) Int. Cl.
  *G06K 19/06*   (2006.01)
  *H04N 19/167*  (2014.01)
  *H04N 19/44*   (2014.01)
  *H04N 19/65*   (2014.01)
  *G06K 9/46*    (2006.01)
  *G06K 9/62*    (2006.01)
  *H04N 13/00*   (2006.01)
  *G06T 7/73*    (2017.01)
  *G06T 7/13*    (2017.01)
  *G06T 7/90*    (2017.01)

(52) U.S. Cl.
  CPC ..... *H04N 19/65* (2014.11); *G06K 2009/4666* (2013.01); *G06T 2200/04* (2013.01)

(56) References Cited

U.S. PATENT DOCUMENTS

| | | | |
|---|---|---|---|
| 8,821,277 B2* | 9/2014 | Boudville | G06K 7/12 235/375 |
| 2003/0151611 A1* | 8/2003 | Turpin | G06F 3/0481 345/589 |
| 2005/0285761 A1* | 12/2005 | Jancke | G06K 19/06037 341/50 |
| 2009/0194596 A1* | 8/2009 | Kimura | G06K 1/123 235/469 |
| 2013/0215473 A1 | 8/2013 | Fan et al. | |
| 2014/0108606 A1 | 4/2014 | Beadles | |
| 2015/0108220 A1* | 4/2015 | Gu | G06K 19/06037 235/462.11 |

* cited by examiner

DESCRIPTION ENCODING/DECODING OF INFORMATION FROM A GRAPHIC INFORMATION UNIT

CROSS-REFERENCE TO RELATED APPLICATIONS

This application claims priority to and the benefit of German Application No.: 10 2014 116 692.2, filed Nov. 14, 2014, which is hereby incorporated herein by reference in its entirety.

The invention relates to a method for encoding information from a graphic information unit and a method for decoding information from an encoded graphic information unit.

Starting in the areas of logistics, automatic identification procedures (Auto-ID) have in recent years become very important in many service sectors, in trade, for the identification of goods and people and in production plants with the help of barcode technology. The task and objective of the Auto-ID is to provide digital information relating to people, animals, goods and articles.

In addition to the automatic identification, especially the so-called mobile tagging provides a wide range of uses for new barcode techniques. Three different areas can be distinguished in mobile tagging: commercial tagging such as in advertising, with additional information on products, direct downloads, direct forwarding to a company's website. Public tagging enriches existing public information, such as signposts, directions, schedules, attractions, or the like. Finally, private tagging, where the focus is on the transmission of private information such as on business cards, URL links, etc.

A rapid growth of applications for barcodes was observed with the development and proliferation of mobile terminals, printers, cameras, scanners and the associated increasing mobile options with the integration of barcodes as a digital information medium in everyday life. Especially the QR (Quick Response) code is increasingly integrated for mobile tagging into everyday life. The reasons for the rapid spread of the QR code reside to a large extent in its high information density (up to 4296 characters) combined with a small footprint and relatively high reading reliability (integration of algorithms for error correction and integrity checking) with modern cameras. Another important point for the high level of awareness of the QR code is its free availability and the integration of QR codes into existing barcode scanner software that can be used on all major smartphones and tablets.

The common barcodes that are nowadays also used in other commercial sectors (the QR Code included) were developed mainly for applications in the logistics industry. This focus is reflected primarily in the design and the security mechanisms. In particular, the original black and white matrix pattern is not adequate for marketing purposes and the enhancement of existing public information due to graphic and effective advertising reasons.

Another criticism of the barcodes currently in use is their very low level of customizability that prevents an individual corporate design. For this reason, for example, graphic extensions that were possible due to the high data redundancy of the QR code were applied to the QR Code (Customized QR Code). Despite a maximum possible data redundancy of 30% with the Customized QR code, the overall picture is dominated by a code that is not adapted to the additional visual information and not interpretable by humans and detached from the rest of the graphic context.

Another major drawback with most existing barcode solutions (including the QR code) resides in the implementation of the security conditions. No security concept exists for the user in all those popular mobile tagging barcode solutions that can be read by a smartphone, because the effect of a scan cannot be evaluated before reading. This weakness has already been exploited by installing malicious software on the smartphone or by forwarding to fee-based services. Another major weakness of many barcodes is the possible falsification by third parties, which can in turn harm the user (for example, exchange of product labels).

U.S. Pat. No. 8,144,922 B2 discloses the use of a transparent infrared absorbing ink for encoding.

U.S. Pat. No. 8,526,670 B2 discloses overlaying a logo with a pattern of cell dots with a brightness that is higher than the brightness of the logo.

EP 2224373 A2 discloses superimposing brighter dots on a logo. The information is essentially represented by white cell dots superimposed on a black logo.

EP 2 731 057 A1 discloses a method for encoding information in an image, wherein a visible pattern is placed over the image and information is encoded in the pattern. The code can be arranged on the region or next to the region of the image.

It is the object of the present invention to improve the encoding or decoding of information.

This object is attained with a method for encoding according to claim 1 and a method for decoding according to claim 13.

The inventive method for encoding information in a graphic information unit includes the steps of:
  determining an outer contour of the information unit; and
  encoding information with an at least two-dimensional code in at least one area solely within the outer contour, wherein the encoding is applied to image elements of the information unit.

The inventive method advantageously enables a new and more intuitive interaction opportunity between analog real information, such as logos and symbolic representations in print media or on real signs or stickers in everyday life, and the digital world. This becomes possible by integrating the code in the information or by applying the code to the information unit. To date, the original image information and the code were always separate. The code is applied only within the region of the information unit, i.e. individual pixel, image elements or sub-elements of the information unit are changed or encoded. The appearance of the information unit is largely left unchanged by limiting the application of the code to the information unit.

A graphic information unit hereby initially includes any graphic representation. This can include individual or connected symbols such as letters and numbers, logos and/or images. The outer contour corresponds to a boundary or distinction between the information unit and a background. The two-dimensional code has two coordinates, for example x and y, wherein the coordinate system may be defined or specified by the region on which the information unit is arranged, and/or by the information unit itself. This 2D encoding can be implemented as a black and white code.

The code or the encoded information unit, respectively, can be attached to physical places and objects and digitally distributed and ensures a substantive relationship in visual form of the information to be encoded. Unlike the barcode shapes currently used in practice, such as the QR code, the content to be displayed can be directly interpreted by a person and detected by a detection device such as a scanner. The encoded information has a considerably more realistic appearance. These technical design measures are of particular importance in view of the human-computer interaction, since a better understanding of the digital content of the barcode is created by a realistic representation of digital content, thus making everyday use more intuitive. These measures also increase the confidence of the user when scanning the encoded information unit. Combining the product image with the corresponding code information would provide a further advantage in the field of logistics by reducing the error rate in the association of the code with the correct product when delivering new goods.

Three-dimensional color encoding can be used, wherein a color space of the color code is at least a portion of a color space of the information unit. In this case, the term realistic is to be understood as adapting the colors to be used to the encoded information unit, so that the code can be encoded with a variable number of hues. Due to the adaptation to the color space of the unit of information, the color design of the information unit and its recognition factor are thereby largely maintained in addition to the shape.

A color subspace of the color space of the color code can be defined locally for a contiguous group of elements of the adaptive pattern, depending on a so-called group color assigned to this group of pattern elements. This group color is hereby determined locally and separately for the particular area of the information unit, in which the group of elements of the adaptive pattern is arranged. In the simplest case, when this area of the unit of information has a single color, the group color corresponds to the color of the area. If the area has a color gradient or is generally multicolored, then the group color can be determined as an average or modal value of the color values present in the area. A contiguous group of elements of the adaptive pattern is, in particular, formed by elements arranged in adjacent rows and/or columns of the pattern, for example, by elements of the pattern that form an n*m submatrix of the pattern, where n and m are integer numbers. A color subspace determined for a contiguous group of elements in such a way is in principle independent of a color subspace that is intended for another group of elements of the pattern located in another area of the information unit. In this way, the entire color space of the encoding is formed only by the individual, locally calculated color subspaces.

Each of the colors of such color subspace may differ from the corresponding group color—and from every other color of the color subspace—only with respect to at least one predetermined color parameter (such as brightness, saturation, hue). Preferred is a distinction according to the brightness. The colors of the color subspace are hence all similar or match the group color, which in turn represents the color of the underlying area of the information unit. This enables encoding of the information unit, which only very slightly disturbs the visual appearance of the information unit. According to a first variant, all the colors of the color subspace can thereby differ "in one direction" along the color parameter of the group color; for example, all the colors of the color subspace may be brighter than the group color. This facilitates decoding. Alternatively, the colors of the color subspace may differ from the group color in "different directions" along the color parameter, for example may be brighter or darker than the group color. This produces an optically even less conspicuous encoding.

By determining the color subspaces locally and only with respect to a contiguous group of elements of the pattern, only the colors of the color subspace associated with the group must be taken into account in a corresponding decoding step, i.e. during decoding of the information that is encoded by the pattern elements of the group. This simplifies the decoding in comparison with an encoding method that uses a global color space for encoding. On the other hand, the entire color space of the encoding, which can be understood as the union of the aforedescribed color subspaces, may be so large so that the encoding can be optimally color-matched to the graphic information unit.

To simplify decoding in the context of color encoding performed in the aforedescribed manner, a predefined element of the group of elements of the adaptive pattern can be colored with the particular color of the color subspace that differs most from the group color with respect to the predetermined color parameter compared to the other colors of the color subspace, for example, as the brightest color of the color subspace. This color then forms a first reference color. In the event that, for example, the group color is still clearly recognizable in the decoding step because the corresponding area of the information unit has, for example, only a single color, the group color can serve as a second reference color. The colors of the color subspace that differ from the first reference color are then arranged with respect to the color parameters "between" the first reference color and the second reference color. Alternatively, the two colors of the color subspace that differ most from each other with respect to the predetermined color parameter, but also from the group color, can be selected as the first and second reference color. For example, this may be the brightest and the darkest color of the color subspace, for example when the group color is positioned with respect to the color brightness between the two colors. A first predefined element of the group of elements of the adaptive pattern can then be colored with the first reference color, while a second predefined element of the group of elements of the adaptive pattern can be colored with the second color reference. The two reference colors can then be read first in the decoding step and the remaining colors of the color subspace can then be determined therefrom, with knowledge of a predetermined number of the colors of the color subspace. In other words, according to this embodiment, each of the contiguous groups of pattern elements has its local color table. Basically, any two colors of the color subspace can be used as reference colors of the color subspace, i.e. the colors that differ most with respect to the color parameter must not necessarily be used as a reference colors. According to this variant, it must also be predefined for decoding, for example in a header information, in addition to the number of colors of the color subspace, how the remaining colors of the color subspace are arranged relative to the reference colors with respect to the color parameter.

The encoding may include at least two markers for position detection of the information unit. Markers for position detection may be used, on the one hand, to clearly indicate during decoding the position of the encoded information unit relative to a detection device. Alternatively or additionally, markers for position detection may be used to indicate boundaries of part of a pattern used for information encoding. Preferably, separate, distinguishable markers for position detection may be used for these two purposes (detection of the relative position in relation to the detection device, detection of the boundaries). Incorporating position detection increases the speed when capturing the code, since a detection pattern or detection model can be placed directly over an encoding pattern by using the at least two markers. Position detection is important in particular for off-line decoding, i.e. without a central server.

Visually distinctive markers and markers that can be easily identified automatically via image recognition, as known for example from the QR code, can be used as markers for position detection.

Alternatively, for example in the case where, as described in detail above, three-dimensional color-coding and an adaptive pattern are used for encoding, markers for position detection—alone or in combination—may be formed by suitable coloring of at least one element of the adaptive pattern with at least one specific marker color. The marker color or marker colors that identify one or more pattern elements as position markers or as part of a position marker, hereby do not exceed a respective predetermined color difference to a color of an area of the information unit in which the at least one element is arranged. A pattern element is here colored with one of the marker colors. If several pattern elements are to be colored with one of the marker colors for forming a position marker, then one or more marker colors can be used, but only one of the marker colors is always used for one of the pattern elements. In this way, the markers remain visually less conspicuous compared to conventional position markers.

A marker for position detection that is formed by coloring a plurality of elements of the adaptive pattern with one or more of the marker colors can in addition be identified by the fact that the elements of the plurality of the elements have a predetermined positional relationship to each other with respect to the adaptive pattern. In other words, the color information and the relative location information hereby cooperate to form a marker for position detection.

The encoding may include a header with information relating to the encoding. This header may include information that is required in certain cases to enable decoding or that facilitates decoding. The header may contain information, such as information about a decoding library (version), a color-coding chart, information regarding redundancy, the character set to be used and encrypting information.

The information to be encoded may be encrypted before encoding. This integration of a security mechanism increases the security by protecting the encoded information unit against tampering by third parties and by protecting the user from downloading malicious software or from forwarding to for-fee services without consent.

An adaptive pattern adapted to the outer contour and/or the color space of the information unit can be used for encoding. The dynamic or adaptive pattern allows the pattern and thus the encoding to be optimally adapted to the information unit, so that the information unit is only slightly changed and the overall appearance is left unchanged for a human observer while the code is accessible to a machine-based detection unit. Advantageously, the human observer detects the encoding and can thus focus, for example, his smartphone at the encoded information unit to obtain the encoded information.

The method according to the invention for decoding information from an encoded graphic information unit includes the following steps:
 detecting an information unit encoded with a method according to at least one of claims 1 to 12; and
 decoding the information from the encoded information unit.

The detection includes, for example, recording and/or scanning with a detection unit such as a smartphone, tablet or a dedicated scanner unit, which are used for example in the logistics sector. The decoding can be performed with the detection unit and/or with a connected computer unit, such as a server. This may preferably be done with a smart phone by using an application or app.

A detection device may transmit the information to a database and may receive from the database an additional item of information associated with the information. This so-called online decoding usually operates with an encoded link that points to an entry in the database. For this purpose, the scanner is connected to the database.

A detection device may process the information. With this offline decoding, all the information is contained in the encoded information unit, thus obviating the need for online functionality in the detection device.

In decoding, at least one of the following steps may be performed:
 Adapting and/or applying a pattern to the detected, encoded information unit;
 Detecting an orientation of the detected, encoded information unit based on at least two markers;
 Detecting a header;
 Decoding the information based on information from the header;
 Performing error correction;
 Decrypting the information;
 Displaying the information.

These steps or individual of these steps may be performed during decoding. The above sequential order is not mandatory, and the steps can also be performed in a different order, or partially in parallel.

An inventive computer program product includes program parts, which when loaded into a computer are designed to perform a method as described above. The same advantages and modifications as described above also apply here.

Figure 2:
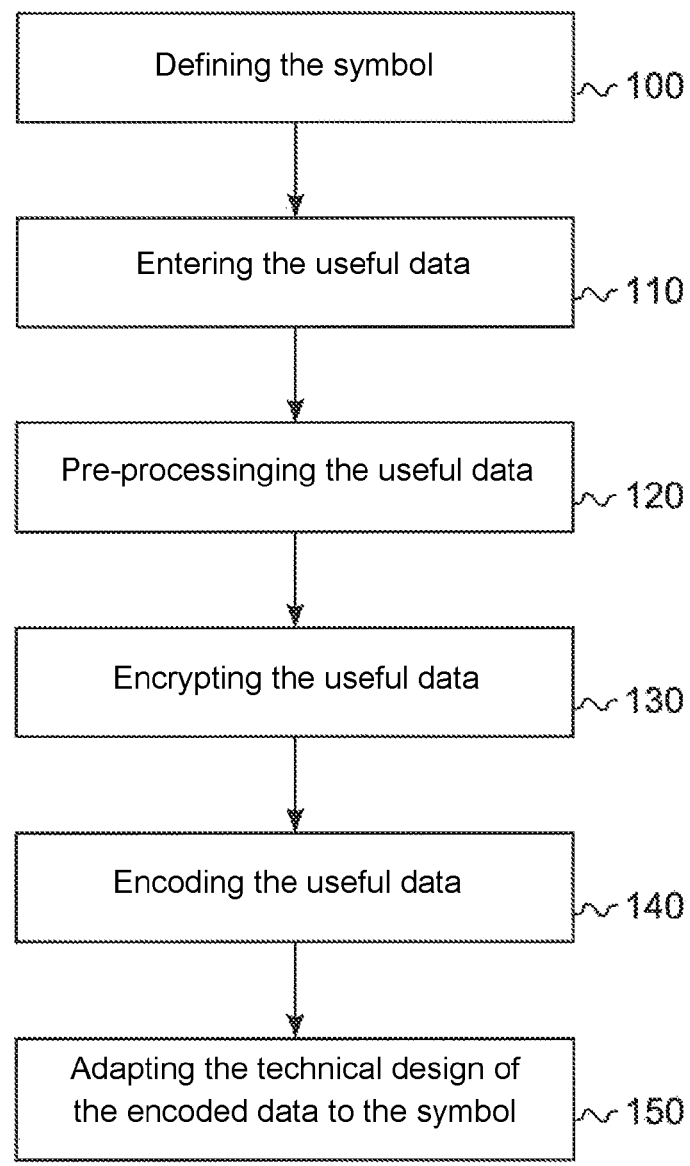
Figure 3:
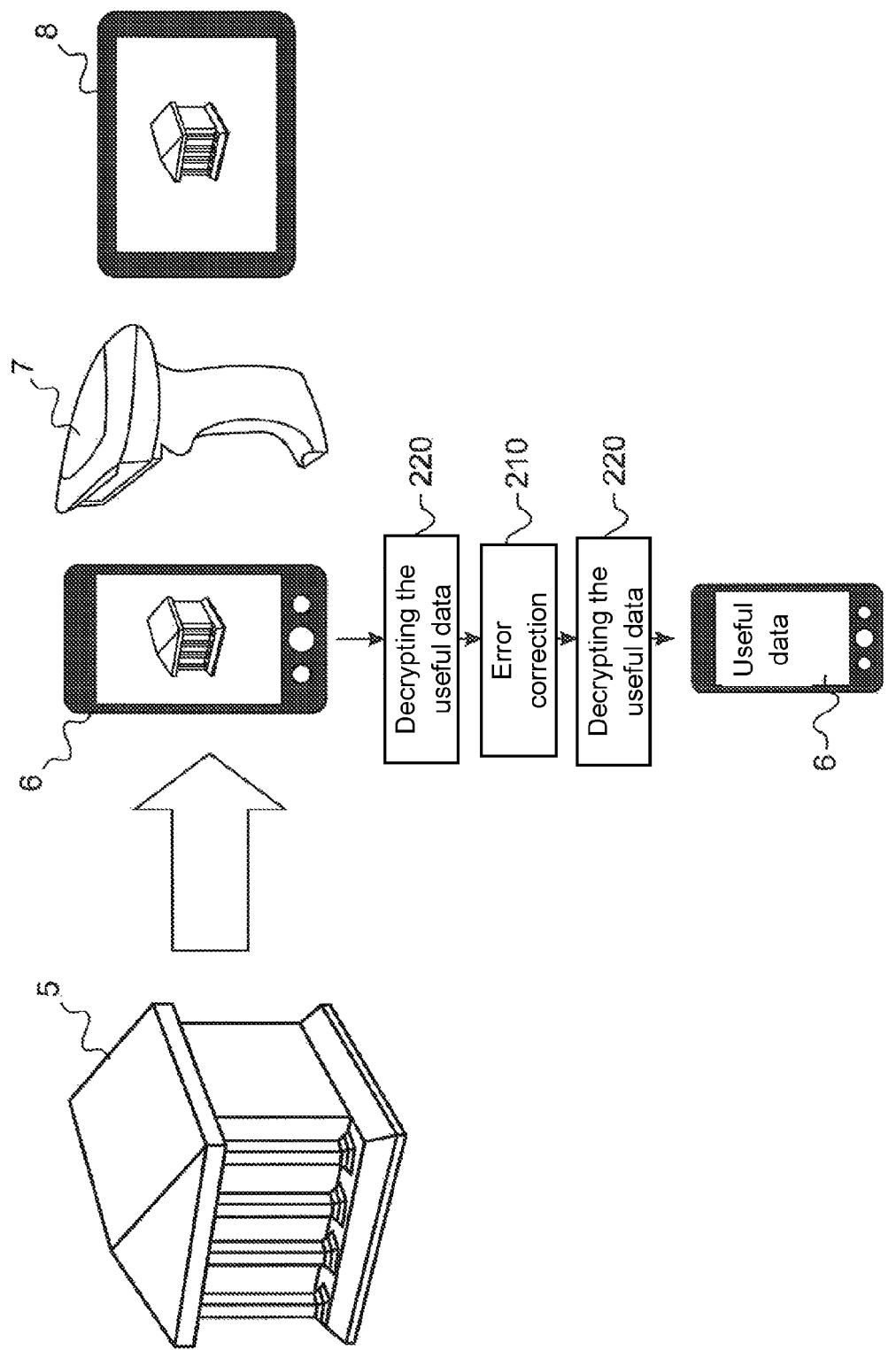
Figure 10:
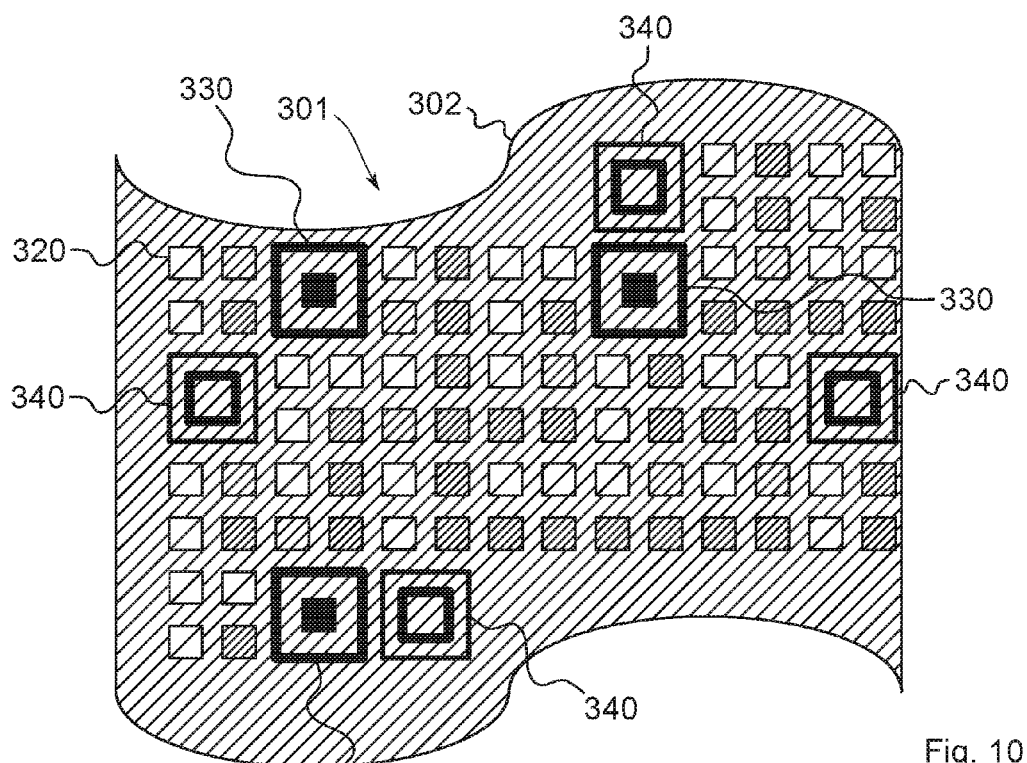

The invention will now be explained in exemplary embodiments with reference to the accompanying drawings, which show in:

FIGS. 1*a* and 1*b* are schematic diagrams of an information unit, and an encoded information unit;

FIG. 2 a schematic diagram of the encoding of an information unit;

FIG. 3 a schematic diagram of the decoding of an encoded information unit,

FIGS. 4 to 9 schematically, specific steps of a method for encoding information in a graphic information unit according to a first preferred embodiment;

FIG. 10 a corresponding encoded information unit; and

Figure 11:
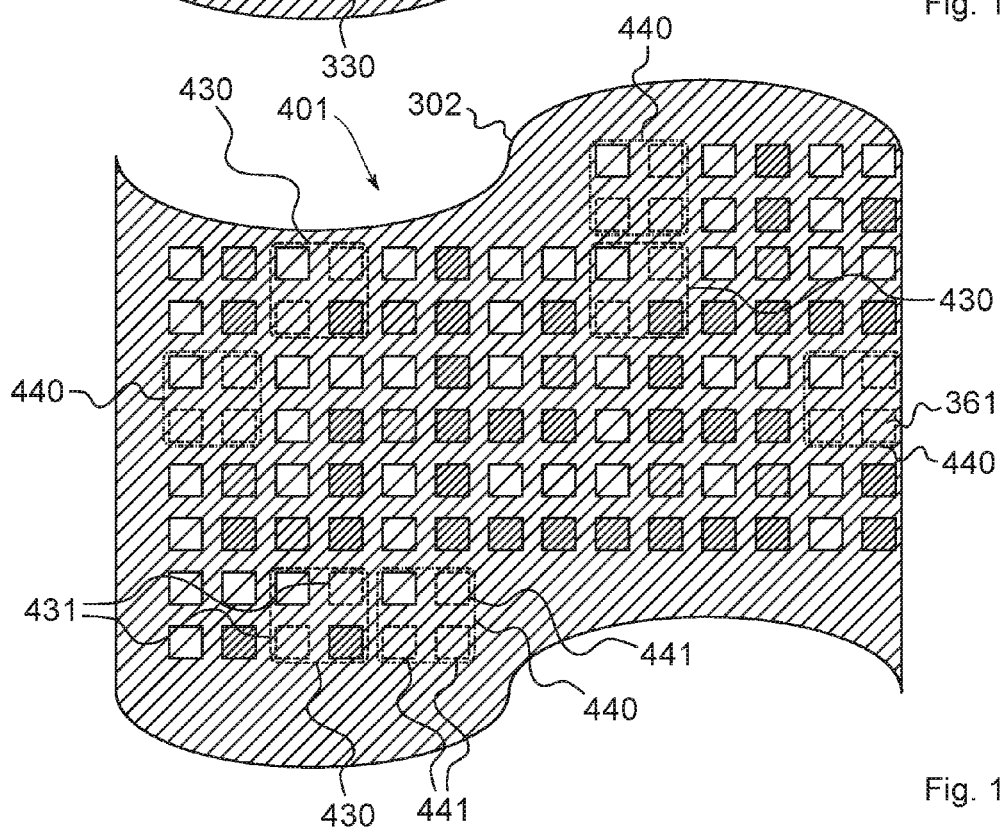

FIG. 11 a variant of the information unit of FIG. 10.

FIG. 1*a* illustrates an information unit 1. The information unit 1 is here composed of a logo or pictorial representation. Generally, an information unit can include all graphic representations or two-dimensional images. The two dimensions are the two dimensions of the surface on which the information unit is displayed. The surface may be flat, for example a sheet of paper or a poster. On the other hand, the surface may be curved, for example in an advertising medium. The two coordinates or dimensions may be referred to as x- and y-direction.

The information unit may also be composed of one or more symbols such as letters or numbers, or of a combination of one or more symbols with one or more pictorial representations.

The information unit 1 is delimited by an outer contour 2, meaning that the outer contour 2 is the boundary or boundary line between the information unit 1 and a background. The background may be disposed on the same surface or may be arranged on another region or surface.

The outer contour 2 encloses an interior space 3, i.e. an area located exclusively within the outer contour 2. The interior space 3 may include multiple areas or sections, of which one area 4 is illustrated as an example. The areas may be, for example, defined by different colors or color spaces. On the other hand, the areas may be defined by different contents, such as a symbol and a pictorial representation. In the illustrated example of a house, the area 4 is, for example, the right side wall. The side wall may have a different color than the roof and the foundation of the house. The columns at the front of the house can also be seen as an area, wherein the three-dimensional effect of the columns is caused by different shades of white or gray.

The information unit 1 may be, for example, a logo for a company, an institution, a service or product, but may also be an indication of an element of information or application. The information unit usually transports a content, with which the viewer of the information unit 1 connects or based on which the viewer expects something. In the conventional sense, such a logo serves as a mental link with a company and/or its product.

In addition to the functions of marketing and disseminating information, for example, in the public sector, such information units are also used in the field of logistics to mark goods, packaging and/or transport container and to allow a quick and secure association or information.

To enhance such information units 1, i.e. to provide them with extended functionality or increased information density, encoding the original information unit 1 of FIG. 1a into an encoded information unit 5 according to FIG. 1b is proposed.

In doing so, information or user data are integrated by applying an at least two-dimensional code within the outer contour 2 to image elements of the information unit 1. The outer contour 2 and thus the outer shape are thus maintained. The encoding can also be applied to the outer contour 2. The outside appearance of the original information unit 1 is taken into account during encoding, which is done by way of the retained outer contour 2. The outer contour 2 of the original information unit 1 and of the encoded information unit 5 is preferably identical. On the other hand, color values or gray levels of the information unit may be taken into account in the encoding, thereby preserving the overall appearance of the original information unit even after the encoding.

In the example depicted in FIG. 1b, the two faces 3 and 4 are encoded. All, one, or as shown several partial areas or parts of the information unit may be encoded. The code 10 consists of individual image elements 11, of which two image elements 11a and 11b are labeled by way of example. To better illustrate the image elements 11 in the diagram of FIG. 1b, a symbol is assigned to each image element 11. Each symbol or each transition between two preferably adjacent symbols may represent a single bit with black and white encoding or a value of one or more bits with color encoding.

Because the figure can be illustrated here only in black and white, the image elements 11 are each shown as a symbol. This representation is preferably a placeholder for gray scale scaling or color-value scaling adapted to the original representation or the original color(s) of the original information unit 1 of FIG. 1a that cannot be depicted in the figure.

With this encoding matched to the information unit, the overall appearance or the aesthetic appearance remains completely or at least almost completely unchanged for the human viewer even after encoding. Furthermore, the information unit additionally includes the encoded function. Thus, the information unit now has the dual function of transporting the original information and the additionally encoded information. The encoded information or the existence of encoded information or, in other words, the application of a code to the information unit may be visible to the human observer and provide him with an indication of the additional encoded information.

The encoding operation will now be described in more detail with reference to FIG. 2.

In a first step or block 100, the information unit is determined or defined. This includes initially the selection of, for example, at least one symbol and/or at least one image unit. The outer contour 2 of the information unit is determined next. This can be achieved by using manual and/or automated techniques such as cropping or cutting.

In a further step 110, the information to be encoded or useful data is inputted. The information can, for example, include a text that is already present or is created on a computer. The text can contain numbers and/or letters and provide, for example, information associated with the information unit or with companies associated with the information unit or the like. The information may also be or include a program code or a command to a program. This may for example include or be, for example, a link to an Internet address or to a database entry.

In a step 120, the user data or information is preprocessed. Preprocessing may include, for example, compressing the information and/or selecting the code. To improve the information density to be encoded, the information to be encoded can then be re-encrypted into code words or compressed in a preprocessing step. To this end, suitable, already existing compression methods may be used and adapted if necessary. Mainly methods from the field of lossless text compression may be considered, such as the LZW algorithm, Huffman encoding or arithmetic encoding.

In a next step 130, the information to be encoded into the information unit 1 is encrypted.

Due to the increased proliferation of mobile Internet-enabled devices in the private and commercial sector, the number of criminal attacks on the owners of these devices is increasing accordingly. The so-called mobile threats can be, inter alia, spying on information, loss of information, identity theft and/or installation of malicious software. Especially in the field of mobile tagging, these vulnerabilities for the user are a frequently mentioned disadvantage of existing barcode solutions such as the QR code, because the user has no information prior to scanning the barcode, and the decoded information cannot be verified with the common barcode scanners.

Since the encoding rules of all currently known barcode solutions are available for implementation, the encoded information can be manipulated by third parties by replacing the barcodes. Appropriate security mechanisms will be used to avoid these vulnerabilities.

The encoding can be implemented with two different approaches, allowing the encoding or the code to be freely adapted to diverse applications. On the one hand, all the information can be encoded directly in the barcode and, on the other hand, all the information can be stored in a database, with the database reference thereafter exclusively encoded directly in the information unit.

This first approach of encoding all the information directly in the barcode is encountered especially in the area of mobile tagging, where for example URL's or contact information are directly encoded in the barcode. Since all the information is directly encoded in the barcode, a much lower information density is attained with this approach than when using a database. No subsequent changes to the stored information can be performed after the code is printed. A subsequent or dynamic change of the information to be encoded is then required, for example due to typing errors or no longer existing URL addresses.

This second approach of storing the entire information in a database and the encoding the database reference is selected in most cases within the logistics sector and in many applications of auto-ID systems. A database is required for the detection and identification of products as well as for counting the products. The code is in these cases used only for identifying the product, with the related information being stored in a database.

To enable transmission of the data obtained in the decoding, for example when decoding on a smartphone, to the respective software for managing the database entries, the smartphone application includes communication functionality, such as TCP/IP functionality. Furthermore, a server component exists which receives the decoded data on the server and has an interface for data exchange with the employed software for managing the database entries. Thus, the database reference is decoded on the client, such as a smartphone. The data are then sent to a central server, which then returns the matching information from the database to the client for display or further processing. The implementation of this infrastructure can use the identical decoding functionality as in the first approach and can hence to some extent be seen as an extension of the first approach by a TCP/IP transmission component.

Existing encryption methods or digital signature methods within the encoding or decoding process and/or within a check digit calculation method can be used to protect against tampering by third parties. This prevents or impedes manipulation of the proposed code. The employed signature method and/or check digit calculation method makes it possible to detect whether the original image or the information unit was changed afterwards and is thus no longer trustworthy. On the one hand, control mechanisms are provided in the smartphone application and, on the other hand, proprietary encoding is provided to protect the user against downloading of malicious software or forwarding to for-fee services without his consent. Harmful abnormalities in the decoded information can be filtered within the smartphone application and displayed to the user.

In a further step 140, the information or useful data are now encoded. For this purpose, a pattern is initially placed over the information unit 1. The pattern is hereby not independent or separate from the information unit. Firstly, it is applied only within the outer contour 2 and secondly, it is not visible, but defines a frame for the application of the encoding of individual pattern elements or image elements of the information unit 1. The pattern is a kind of template by which the encoding is applied to the information unit 1.

The selection of the pattern structure is determined by the shape or form of the pattern and an essential parameter for the later code, since the pattern shape and the pattern color affect the design of the image to be encoded. In addition, the reliability for reading the code and the possible information density also depend on the choice of the shape or color of the pattern.

The binary system is preferably used for encoding the information characters such as letters, numbers and/or symbols within the code. Accordingly, changes in the grayscale or colors between the individual pattern elements or pixels of the information unit or the image are converted into bit strings. To convert the bit strings into usable characters, a reference table and a corresponding character set must be agreed upon. The reference table indicates the relationship between the present bit string and the corresponding character from the selected character set. Preferably, common character sets such as the numeric, alphanumeric or the ISO character set are considered for the encoding rules.

In order to improve a realistic appearance and to increase the information density, color encoding is preferably used in addition to the two-dimensional position encoding, thus creating a three-dimensional code. While a black-and-white code has an information density of one bit per pixel, a color code has an information density depending on the number of colors per pixel. Since the color space is variable, depending on the information unit, the encoding and the information density are also variable.

Due to the requirement for a realistic representation, the colors matching the encoded image are preferably used for the encoding. Methods from image processing are used to define the color space to be used by taking into account the colors of the original image. To enable the use of a variable number of colors for encoding, the corresponding character set reference table is also variable. Because the number of selected hues for encoding, the design of the character set-up table and its size determine the information density, a corresponding dynamic method is employed. The employed dynamic method hereby adheres to the predetermined color space which can be automatically selected based on the original image or manually by the user. The assignment of colors to the individual elements of the encoding pattern is calculated based on the color differences at the position of this element in the original image. The color differences are adjusted accordingly if the corresponding color difference is below the minimum limit required by a camera when taking into account environmental influences (e.g. lighting, pollution) for identifying these colors as different colors by specifying an error tolerance. The number of the hues used to select the appropriate reference table of the character set is encoded directly in the code header.

Finally, in a last step 150 of the encoding, the design of the encoded data is adapted to the information unit. This task includes the adaptation of the code pattern to the image, logo or the symbolic representation of the information unit to be encoded. To be able to encode only the logo and the symbolic representation and not the background of the original image, the logo or the symbolic representation must be separated from the background prior to encoding, either automatically or semi-automatically. For a realistic representation, the logo or the symbolic representation should be used exclusively for encoding. The separation can be performed manually by the user or by image processing methods. A detection pattern including a header, an encoding pattern and a variable position detection for encoding is automatically or semi-automatically determined based on this separated image section, which serves as information unit in the course of encoding.

Due to the very wide variety of information units to be encoded or of images, logos or symbolic representations, in which the code is integrated, a customizable code matching the shape of the original image is provided by taking into account a high reading reliability with conventional smartphones, tablets or commercial monochrome or non-monochrome camera scanners. For this purpose, variable position detection and a pattern structure adjustable to the form of the original image are provided.

After these steps, an encoded information unit 5 has been created, in which additional information has been encoded. The overall appearance of the original information unit 1 is hereby maintained, because the encoding is, on the one hand, applied only within the boundaries of the information unit and is, on the other hand, applied directly to the information unit itself or to pattern elements or image elements of the information unit. A pattern is hence only used as a mask or as an intermediate step for encoding, and can no longer be fully perceived directly or cannot be fully perceived in the encoded information unit.

The decoding of an encoded information unit 5 will now be described by way of example with reference to FIG. 3.

Initially, the encoded information unit 5 is scanned or recorded, which can be done for example by using a smartphone 6, a scanner 7 or a tablet 8. Generally, an image detection unit, for example in the form of a camera, and an evaluation or processing unit that evaluates the recorded image, i.e. extracts the encoded information, are required.

For this purpose, the useful data or information are first decoded. The decoding includes several sub-steps.

In order to correctly project the defined pattern that may be included in the decoding library onto the information unit 5, the position of the camera in relation to the information unit 5 is determined, which is implemented by a position detection pattern or a plurality of markers, preferably two or three markers, for position detection. The position detection pattern is selected so as to enable omnidirectional readability with a smartphone, tablet or a camera scanner, while adversely affecting the design of the original image not at all or only insignificantly.

Depending on the field of application, different demands are placed on the magnitude of the density of information and the security of the code. While usually only shorter items of information need to be stored in the code with mobile tagging, for example digital business cards or URL's, the field of logistics and auto ID systems places higher demands on the code. In addition to high security requirements, the code is in most cases linked to a database entry where accompanying detailed product information is stored. The barcode is in this case used not only for displaying information, but is also used for administrative tasks. For example, the number of units is decremented in the corresponding database entry when the article is sold.

To meet the aforementioned requirements on the code, an extension of the pure decoding functionality within the smartphone application by a TCP/IP component is contemplated. With this extension, the following infrastructure approaches encountered most frequently in practice for processing and interpreting barcodes can be implemented in practice.

The first approach for decoding commonly used in practice uses a database where decentrally decoded code information is transmitted from a client, such as a smart phone, to a central server, which returns through a database query information associated with the code. This can involve reading a barcode of a product and directly displaying the corresponding product information. The employed server may be a company-internal server as well as a web server so that the infrastructure can be varied depending on security requirements and application field. This solution can also be used to subsequently make changes in the barcode, for example to correct typographical errors or to change product information, since only the database reference stored in the code and therefore only one central database entry need to be changed, rather than re-encoding all the barcodes that are affected by this information change.

Conversely, the approach for decentralized local decoding exists on the terminal such as a tablet or smartphone that does not need a connection to a network or server. This approach does not allow for subsequent changes in the encoded information and obtains the complete information exclusively from the image data. This approach is currently being used in almost all mobile tagging applications and offers a particularly high level of flexibility, because access to a network is not required.

The two approaches have advantages and disadvantages depending on the application field and are therefore selected on a case-by-case basis. The same decoding functionality is used to implement the two approaches. The aforementioned approaches can be used in various application fields with an optional TCP/IP component that can be added by a future user if needed, for transmitting the decoded information to any server.

The information unit is decoded on the basis of the header, the position detection and the known decoding algorithm. The information needed for decoding, such as the employed encoding version, can be obtained or derived from the header or from a universal element of information or from an agreement.

The decoding algorithm calculates the useful data based on the bit information from the individual image elements or pixels, or based on the bit information from the transitions between the individual image elements or pixels. The use of more than two colors enables bit information with more than one bit per transition between two pixels or image elements. Encoding one bit (0 or 1) per transition would be possible when using two colors (e.g. black and white). The relevant number of bit information per transition therefore depends on the number of colors used for encoding. The concatenation of successive bit information is referred to as bit string.

Based on the reference table of the character set specified in the header of the encoded information unit, the bit string can be converted to the target alphabet or the target character set (e.g. ASCII data set—using an 8-bit string for mapping a character of a character set of 256 characters).

In a further, optional step 210, an error detection or error correction is performed. The data obtained from the error correction can optionally be used as empirical values or parameters for new encodings in order to reduce the error rate during transmission. This can create a feedback loop for the improvement of encoding/decoding. The error detection may be based on known methods, for example, by using redundancies or checksums.

Overall, the entire optical/imaging path must be considered in the context of the efficiently usable code and, upon reaching parameter limits, feedback to the code and/or the encoding may be required. Regarding the code, the following parameters are defined for this purpose: minimally tolerable contrast, the influence of disturbances caused by contamination, wear, damage, the maximum amount of information to be stored, and the use of hierarchical information storage.

The code should also be usable by systems that are equipped with conventional fixed focus cameras, such as smartphones. The image acquisition path is characterized by the distance of the object to the recording system, the illumination of the object, the lens of the recording system with parameters such as focal length, image quality and luminous intensity. Another criterion is the sensor and the data storage, as well as parameters such as sensor size (resolution), signal-to-noise ratio, image data to be stored, the storage format, under certain circumstances a lossy storage and additional information to the code information, such as location, time, etc.

It makes sense to enable information feedback during the image recording when using the code. This feedback may include the control of the data recording, for example, the detection of the encoding type, analysis of the alignment and control of the shooting distance, wherein instructions to the recording device are specified via the recording algorithm. Other aspects may include image pre-processing and extraction of target information.

The individual aforedescribed components interact and are advantageously considered together. It is expected that recursions of the development must be carried out in order to create and implement a stable concept with high error tolerance and a simple, real-time algorithm.

Taking into account and indicating error tolerances are a very important aspect for the practical use in order to enable reconstruction of the information from erroneous codes. Errors within a code can occur when the code is damaged, due to inadequate print quality or due to disturbances caused by environmental influences during recording. This can occur, for example, because the code is masked by another object or due to unfavorable lighting conditions. Such errors must be considered for practical applications in order to guarantee a high error tolerance.

Existing error correction algorithms, for example the Reed-Solomon algorithm, can be used to take error tolerances into account.

One element in the use of the code can be redundancy of information to be integrated in order to safely detect data fields that are disturbed to a certain extent. Here, the implementable level of redundancy plays a central role, because this level has direct impact on the still permissible disturbance of the code, for example due to diminishing contrast, due to missing or not decodable partial areas and/or the quality of the illumination. Parameters of the required image detection hardware, such as the sharpness of the image, the necessary effective image resolution and/or the speed of the preprocessing or processing of the image data, also play a role.

The required algorithm or the performance of image processing, such as the integratability into the target environment/hardware, the real-time capability in the target environment and/or the ease of use can also be considered.

The actual image processing includes recording and extraction of the information of the code with the available surrounding hardware and its interfaces. The detection algorithms and additional image processing tools within the context of preprocessing, such as the detection of a pattern, are to be distinguished from the control of the hardware via a user interface when creating the recording, such as adjusting the distance of the camera to the object, the detecting and specifying of a better corrected shooting angle, and/or the usage of a hierarchical code, for example based on the parameters orientation, code type, basic information and/or detailed information. Finally, the actual extraction of the target information, i.e. of the useful data (payload data), is taken into account.

In a step 220, the useful data are decrypted if they were encoded by encryption. This step is therefore optional. Information about the selected encryption may for example be contained in the header.

Finally, the useful data are displayed and/or processed, which can be done in the detection device, such as the smartphone 6, or in another instance, such as a computer connected to the detection device. The information encoded in the information unit which is optionally encrypted is then again available.

A preferred embodiment of a method for encoding information in a graphic information unit will now be illustrated with reference to the FIGS. 4 to 9. In particular, the steps 140 and 150 which relate to the encoding of the information unit and which have been described above in general with reference to FIG. 2 will be explained in detail.

Figure 4:
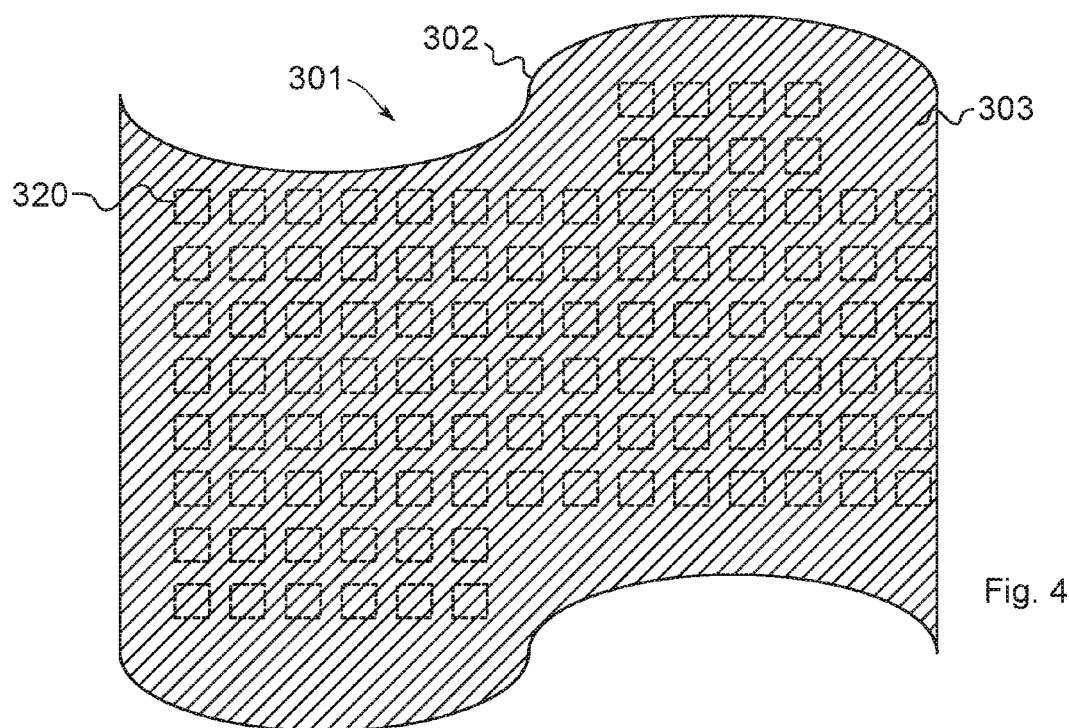

FIG. 4 shows a graphic information unit 301 with an outer contour 302 which delimits and encloses an inner area 303 to be encoded. The information unit 301 may for example be part of a logo.

In a preparatory step, a pattern adapted to the outer contour 302 is placed on the information unit 301 for encoding the information unit 301. The respective elements 320 of the adaptive pattern are arranged in form of regular rows and columns along predetermined directions (X and Y directions). Size and shape of the pattern elements 320, and the pattern element spacing in each of the two directions, and thus also a number of pattern elements, can be varied.

Figure 5:
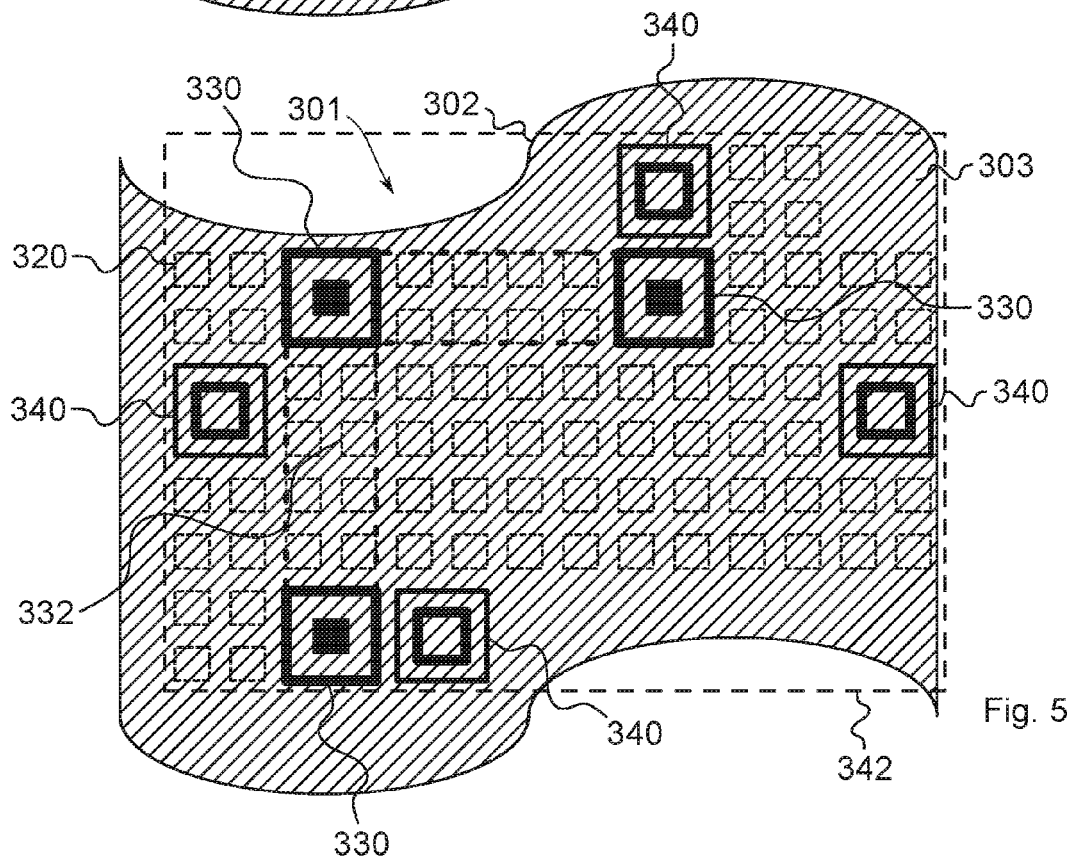

FIG. 5 illustrates an example of an optional step of placing markers 330, 340 which allow position detection of the encoded information unit during decoding.

The markers 330 for position detection are arranged so as to be able to unambiguously determine a position of the encoded information unit relative to a detection device during decoding. In other words, a detected encoding of the information unit 301 can be optionally rotated and/or scaled based on the markers 330 to allow for unambiguous and correct decoding. Even a perspective distortion that may occur when the encoding is detected can be corrected based on these markers 330. The exemplary markers illustrated in FIG. 5 can be readily recognized and processed during decoding without additional preparation after detection of the encoding, thereby simplifying the decoding overall.

Optionally, header information 332 which may include information or data that simplifies decoding of an encoded information unit or makes decoding of an encoded information unit possible may be introduced into the encoded information unit. Such information may relate for example to the pattern, to a predetermined number of color gradations, to optionally employed encryption and the like. Preferably, such header information is arranged in areas between the position markers 330, as indicated by the dotted lines in FIG. 5, so that they can be retrieved quickly and easily at the beginning of the decoding process.

As another optional feature, markers 340 that define the boundaries of the pattern used for encoding of information may be additionally provided for position detection. These boundaries are indicated in FIG. 5 by the frame 342.

FIGS. 6 to 9 illustrate the design of a concrete embodiment of a three-dimensional color code. Different colors are shown in the figures in form of differently hatched areas.

Figure 6:
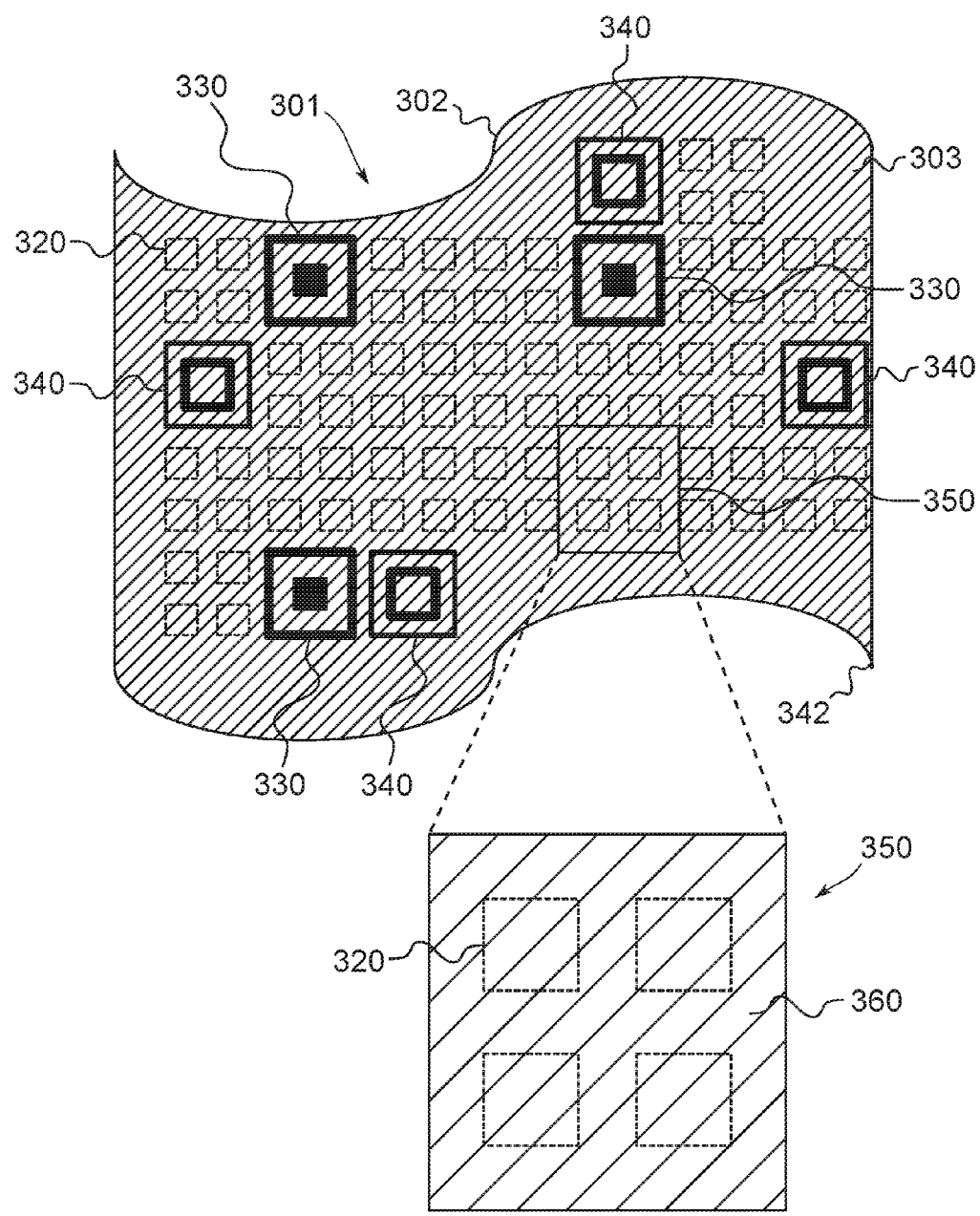

As shown in FIG. 6, in a first sub-step, the elements of the pattern are in each case divided into groups 350 of contiguous elements 320 of the pattern. In the illustrated example, one such group 350 consists of a 2*2 sub-pattern. It will be understood that the dimension of such a sub-pattern can be variable, for example, it can have the size 2*3, 4*2, 3*3, 4*4, or similar sizes. It is only important that all elements of such a group are arranged in a contiguous area of the information unit, i.e. in some way adjacent to each other.

In a further sub-step, a group color 360 is now determined for such a group 350. This group color 360 is determined based on a color distribution in the area of the information unit that includes the pattern elements 320 belonging to the group 350. One such area is shown by way of example at the bottom of in FIG. 6. If this area has a single color, then this color corresponds to the group color 360. If the area includes several colors or a color gradient, then the group color 360 is formed as an average or modal value across the colors of the area.

Figure 7:
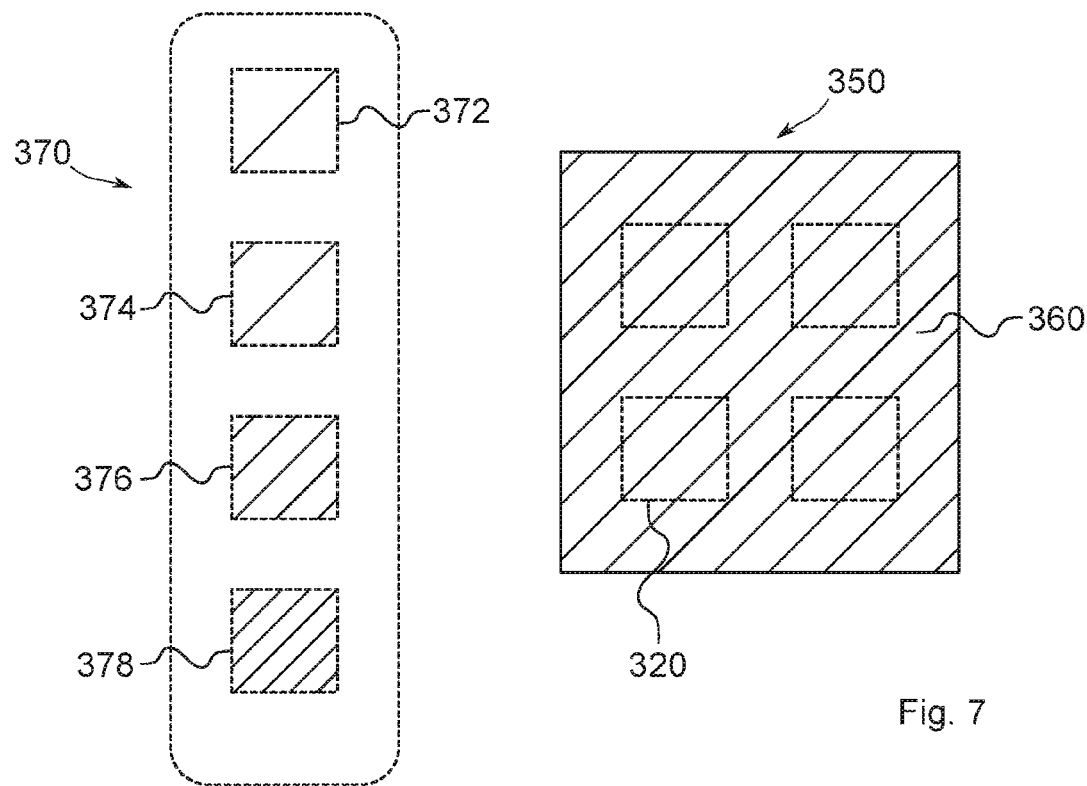

FIG. 7 illustrates how, depending on the group color 360, a color subspace 370 is determined for the pattern elements 320 of the group 350 locally, i.e. only for the one group 350 and only depending on the group color 360 specific for the one area, with the color subspace 370 including those colors that are then used for coloring the pattern elements 320 of the group 350, i.e. for encoding the information unit 301 in the area where the elements 320 of the group 350 are arranged. The size of the color subspace 370, i.e. the number of different colors in this color subspace, can be defined in advance and can be indicated in the header information 332, for example for decoding. In the illustrated example, the color subspace 370 includes four colors 372, 374, 376 and 378.

The colors 372, 374, 376, 378 of the color subspace 370 differ from the group color 360 only in one color parameter, in the illustrated example in the brightness. Other color parameters, such as saturation or hue, or preset combinations of such color parameters can also be used to form the colors of the color subspace based on the group color in a predetermined manner. The colors of the color subspace are thus formed or calculated so as to be always similar to the group color, and thus similar to the color of the area of the information unit, in which the elements of the pattern that are colored with these colors in conjunction with encoding are arranged. This approach ensures that the color space of the encoding, and thus the adaptive pattern, is in every area of the information unit matched to the color space of the information unit.

Figure 8:
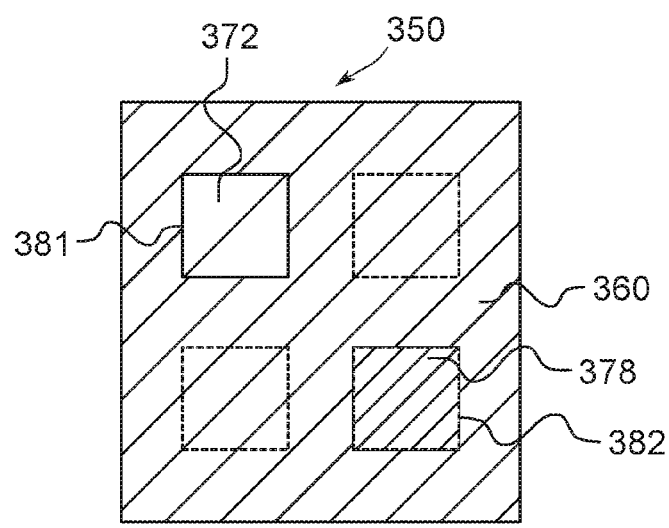

FIG. 8 illustrates in form of an example how an encoding that was introduced in the corresponding area of the information unit by way of the colors 372, 374, 376, 378 of the color subspace 370 can be decoded in a simple manner. For this purpose, two particular colors 372, 378 of the color subspace 370 are selected as first and second reference color, namely those colors of the color subspace 370 that differ most with respect to the predetermined color parameter within the color subspace 370. In the illustrated example, this is the brightest 372 and darkest color 378 of the color subspace 370. These two reference colors color two predetermined elements of the group 350, namely the element 381 in the upper left corner and the element 382 in the lower left corner of the 2*2 sub-pattern that forms the group 350. This procedure is intended to ensure that the colors of these two predefined elements are detected first in the decoding step and evaluated as reference colors 372, 378. The remaining colors 374, 376 of the color subspace 370 can then be unambiguously determined locally based on these reference colors 372, 378 and with knowledge of the number of colors of the color subspace 370.

Figure 9:
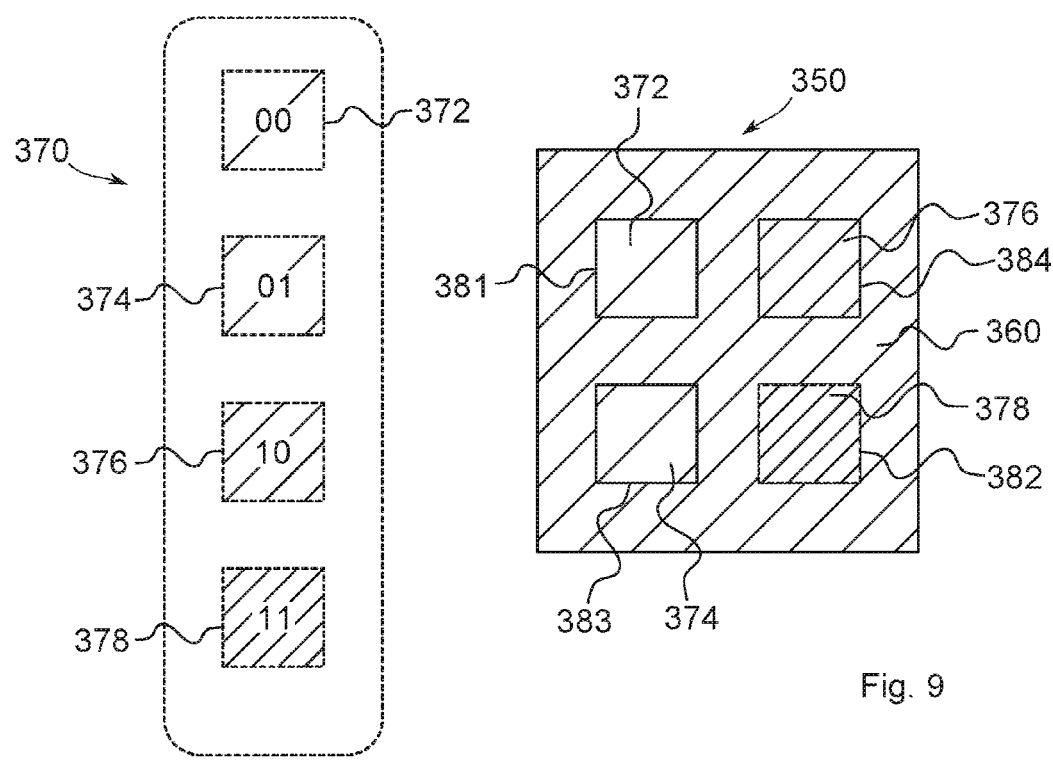

As indicated at the left side of FIG. 9, a character string that can be encoded with this color can be unambiguously associated with each color 372, 374, 376, 378 of the color subspace 370. The other two pattern elements 383, 384 of the group 350 can now be freely used, as indicated at the right side of FIG. 9, to encode information, i.e. each can be colored with one of the colors 372, 374, 376, 378 of the color subspace 370.

Lastly, FIG. 10 shows as an example an information unit 301 that is fully encoded in the manner described above. For ease of understanding, all groups 350 have here been colored with respect to the same group color 360, as would be the case for example, when the information unit 301 as a whole had only one color.

FIG. 11 illustrates a variant 401 of the encoded information unit 301 of FIG. 10. The variant 401 differs from that of FIG. 10 in the type of the position markers 430, 440. In the example shown in FIG. 11, the position markers 430, 440 consist of partially specifically colored pattern elements 320 of the pattern itself. The position markers 430, 440 include here a plurality of pattern elements 320, corresponding to the a foredescribed groups 350 of contiguous pattern elements 320. The position markers 430, 440 are identifiable, on the one hand, in that several of the pattern elements of the position markers 430, 440 are colored with a specific marker color 361. The marker color 361 is characterized in that it does not exceed a predetermined color difference with respect to a color of the area, in which the pattern elements of the marker location are arranged. In other words, the marker color 361 is also similar to the corresponding color of the area of the information unit. Alternatively, a plurality of marker colors could be used, which would then each meet the above-mentioned color difference criterion. Basically, the same approach can be used for determining a marker color 361 as for determining the group color for a group of pattern elements or as for determining the colors of a color subspace for such a group. In the illustrated example, one of the marker colors 361 matches the group color 360, i.e. the color difference between the marker color 360 and the color of the corresponding area of the information unit is zero. The marker color 361 may differ from the color of the corresponding area of the information unit also within predetermined limits, as long as there is no risk of confusion with a color of a corresponding color subspace of a group of pattern elements potentially associated with this area.

Another characteristic of the markers 430, 440 is the specific mutual spatial arrangement of a plurality of pattern elements colored in the marker color 361— diagonally opposite in the position markers 430, and in an L-shape in the position markers 440. In the context of such an embodiment, different marker colors may be used instead of just a single marker color 361.

As seen from FIG. 11, particularly in comparison to FIG. 10, a visually very inconspicuous encoding of the information unit 301 can be achieved by using suitably formed position markers 430, 440. The complexity of decoding, detecting and evaluating the position markers 430, 440, however, increases compared to the use of conventional location markers, as shown in FIG. 10, mainly because the actual adaptive pattern must be detected in an embodiment according to FIG. 11 in a first sub-step of decoding without reliance on position markers 430, 440. Accordingly, the position markers 440, which are provided for determining the boundaries of an information-encoding area of the information unit, may essentially be dispensed with in the exemplary embodiment illustrated in FIG. 11, because the pattern and its boundaries can be detected even without these markers.

The invention claimed is:

1. A method for encoding information in a graphic information unit, comprising:
   determining an outer contour of the graphic information unit; and
   encoding information with an at least two-dimensional code in at least one area located solely within the outer contour, wherein the encoding is applied to image elements of the graphic information unit;
   wherein a three-dimensional color encoding is used, and a color space of a color code is at least a portion of a color space of the graphic information unit;
   wherein an adaptive pattern, which is adapted to the outer contour and/or the color space of the graphic information unit, is used for the encoding; and
   wherein a color subspace of the color code is defined locally for a group of elements of the adaptive pattern, depending on a group color that is defined for an area of the graphic information unit, in which the group of elements of the adaptive pattern is arranged.

2. The method according to claim 1, wherein a color of the color space of the color code is assigned to an element of the adaptive pattern based on a color difference between this color and a color of the graphic information unit at the location that corresponds to the element of the adaptive pattern.

3. The method according to claim 1, wherein each of the colors of the color subspace differs from the group color with respect to a predetermined color parameter.

4. The method according to claim 3, wherein
a predetermined element of the group of elements of the adaptive pattern is colored with the particular color of the color subspace that differs most from the group color with respect to the predetermined color parameter, or
wherein the two colors of the color subspace are selected that differ most from each other with respect to the predetermined color parameter, and wherein a first predetermined element of the group of elements of the adaptive pattern is colored with the first of the two colors and a second predetermined element of the group of elements of the adaptive pattern is colored with the second of the two colors.

5. The method according to claim 1, wherein the encoding has at least two markers for a position detection of the graphic information unit.

6. The method according to claim 5, wherein a three-dimensional color encoding is used and wherein an adaptive pattern is used for the encoding, with the adaptive pattern being adapted to the outer contour and the color space of the graphic information unit, and wherein markers for the position detection are formed by coloring at least one element of the adaptive pattern with at least one marker color, wherein the at least one marker color does not exceed a predetermined color difference with respect to a color of an area of the information unit, in which the at least one element is arranged.

7. The method according to claim 6, wherein a marker for position detection is formed by coloring a plurality of elements of the adaptive pattern with at least one of the at least one marker color, wherein the elements of the plurality of elements have a predetermined positional relationship to each other with respect to the adaptive pattern.

8. The method according to claim 1, wherein the encoding includes a header with information about the encoding.

9. The method according to claim 1, wherein the information is encrypted during the encoding.

10. A method for decoding information from an encoded graphic information unit, comprising:
detecting information in the encoded graphic information unit that is encoded by a method according to claim 1; and
decoding the information.

11. The method according to claim 10, wherein a detection device transmits the information to a database and receives from the database a further item of information associated with the information, or wherein the detection unit processes the information.

12. The method according to claim 10, wherein during decoding at least one of the following steps is executed:
adapting and/or applying a pattern to the information;
detecting an orientation of the encoded graphic information unit based on at least two markers;
detecting a header;
decoding the information based on information from the header;
performing an error correction;
decrypting the information; and
displaying the information.

* * * * *